United States Patent
Tada et al.

(10) Patent No.: US 8,708,851 B2
(45) Date of Patent: Apr. 29, 2014

(54) POWER TRANSMISSION CHAIN AND POWER TRANSMISSION SYSTEM INCLUDING SAME

(75) Inventors: Seiji Tada, Kashiba (JP); Shigeo Kamamoto, Kashiwara (JP)

(73) Assignee: JTEKT Corporation, Osaka-Shi, Osaka (JP)

( * ) Notice: Subject to any disclaimer, the term of this patent is extended or adjusted under 35 U.S.C. 154(b) by 308 days.

(21) Appl. No.: 12/920,274

(22) PCT Filed: Feb. 25, 2009

(86) PCT No.: PCT/JP2009/053392
§ 371 (c)(1),
(2), (4) Date: Aug. 30, 2010

(87) PCT Pub. No.: WO2009/116368
PCT Pub. Date: Sep. 24, 2009

(65) Prior Publication Data
US 2011/0003658 A1 Jan. 6, 2011

(30) Foreign Application Priority Data
Feb. 28, 2008 (JP) ................................ P2008-048396

(51) Int. Cl.
*F16G 13/04* (2006.01)
(52) U.S. Cl.
USPC ........... 474/215; 474/216; 474/217; 474/244; 474/245
(58) Field of Classification Search
USPC .................. 474/215, 216, 217, 244, 245
See application file for complete search history.

(56) References Cited

U.S. PATENT DOCUMENTS

| 4,801,289 A | 1/1989 | Sugimoto et al. |
| 7,846,050 B2 * | 12/2010 | Miura ........................ 474/245 |

(Continued)

FOREIGN PATENT DOCUMENTS

| EP | 1 788 280 A2 | 5/2007 |
| EP | 1 837 552 A2 | 9/2007 |

(Continued)

OTHER PUBLICATIONS

Chinese Office Action dated May 3, 2012, with English translation.

(Continued)

*Primary Examiner* — Sang Kim
(74) *Attorney, Agent, or Firm* — McGinn IP Law Group, PLLC

(57) ABSTRACT

With a view to suppressing fretting in a power transmission chain, when a chain straight-line area is seen from a chain widthwise direction W, a flat portion 18 of a first pin 3 of the chain extends in an inclination direction D. A point of intersection P0 is formed by an imaginary line L1 which passes through a center position of an overall height h of the first pin 3 along the inclination direction D intersecting the flat portion. A point of intersection P2 is formed by an imaginary line L2 which passes through a contact portion A0 and which extends in a chain advancing direction X intersecting the flat portion 18 between the point of intersection P0 and one end P1 of the flat portion. When assuming that a distance between the point of intersection P0 and the point of intersection P2 is referred to as h1 and a distance between the point of intersection P2 and the one end P1 of the flat portion 18 is referred to as h2, $0.1 \cdot h1 \leq h2$.

6 Claims, 10 Drawing Sheets

(56) References Cited

U.S. PATENT DOCUMENTS

| | | | |
|---|---|---|---|
| 7,874,952 B2 * | 1/2011 | Tada et al. | 474/237 |
| 7,882,689 B2 * | 2/2011 | Tada et al. | 59/35.1 |
| 8,038,559 B2 * | 10/2011 | Tada et al. | 474/155 |
| 8,100,794 B2 * | 1/2012 | Kamamoto et al. | 474/157 |
| 2007/0087882 A1 | 4/2007 | Vornehm et al. | |
| 2009/0118042 A1 | 5/2009 | Rothenbuhler et al. | |
| 2009/0233744 A1 | 9/2009 | Kitamura et al. | |

FOREIGN PATENT DOCUMENTS

| | | |
|---|---|---|
| EP | 1 998 077 A2 | 12/2008 |
| JP | 64-15840 | 1/1989 |
| JP | 2006-144976 | 6/2006 |
| JP | 2006-170314 A | 6/2006 |
| JP | 2006-226405 | 8/2006 |
| JP | 2006-226451 | 8/2006 |
| JP | 2007-10049 | 1/2007 |
| JP | 2007-51712 | 3/2007 |
| JP | 2007-107670 A | 4/2007 |
| JP | 2007-270913 | 10/2007 |
| WO | WO 2007/038909 A1 | 4/2007 |
| WO | WO 2007/043209 A1 | 4/2007 |

OTHER PUBLICATIONS

Extended European Search Report dated May 2, 2012.
Notification of Reasons for Refusal dated Oct. 12, 2012, with English translation.
Notifications of Reasons for Refusal dated Sep. 4, 2013 with English translation.

* cited by examiner

POWER TRANSMISSION CHAIN AND POWER TRANSMISSION SYSTEM INCLUDING SAME

TECHNICAL FIELD

The present invention relates to a power transmission chain and a power transmission system including the same chain.

BACKGROUND ART

Endless power transmission chains which are used in automotive power transmission systems such as a pulley-type continuously variable transmission (CVT) include an endless power transmission chain in which a plurality of links are aligned in a chain advancing direction and links laid adjacent in the chain advancing direction are connected together by pairs of pins which can move rollingly relative to each other (for example, refer to Patent Document 1).
Patent Document 1: JP-A-2006-226451

DISCLOSURE OF THE INVENTION

Problem that the Invention is to Solve

In the power transmission chain described above, a pair of pins are inserted through each of a pair of through holes formed in the link, and when the power transmission chain is driven, tensile force is designed to be applied to the like by one pair of pins and the other pair of pins.

In a straight-line area of the power transmission chain, a contact portion between the pair of pins is positioned rather inwards in a chain radial direction. Because of this, a load applied between the pair of pins is applied inwards of the pair of pins in the chain radial direction, as a result of which one of the pins attempts to rotate (rotate on its axis) within the through hole. As a result of this, the pin slips relative to the link, causing fretting.

The invention has been made in view of the background, and an object thereof is to provide a power transmission chain which can suppress fretting and a power transmission system including the power transmission chain.

Means for Solving the Problem

With a view to attaining the object, according to a first aspect of the invention, there is provide a power transmission chain (1) including a plurality of links (2) which are aligned in a chain advancing direction and a plurality of connecting members (50) which extend in a chain widthwise direction (W) which is at right angles to the chain advancing direction so as to connect the links together, wherein the connecting member includes first and second power transmission members (3, 4) which have facing portions (12, 22) which face each other, the facing portions rollingly and slidably contact each other at a contact portion A which is displaced in association with a change in a turning angle (θ) between the links, a flat portion (18) is provided on a back surface (13) of the first power transmission member which lies opposite to the facing portion, the flat portion is inclined along an inclination direction (D) which is inclined relative to the chain advancing direction when a chain straight-line area is seen from the chain widthwise direction, a point of intersection P0 is formed by an imaginary line L1 which passes through a central position of an overall height (h) of the first power transmission member along the inclination direction and which intersects the inclination direction at right angles intersecting the flat portion when the chain straight-line area is seen from the chain widthwise direction, a point of intersection P2 is formed by an imaginary line L2 which passes through the contact portion A and extends in the chain advancing direction intersecting the flat portion between the point of intersection P0 and one end P1 of the flat portion when the chain straight-line area is seen from the chain widthwise direction, and the following expression is satisfied when a distance between the point of intersection P0 and the point of intersection P2 is referred to as h1 and a distance between the point of intersection P2 and the one end P1 of the flat portion is referred to as h2 with respect to the inclination direction.

$$0.1 \cdot h1 \leq h2$$

According to the invention, due to the contact portion A of the first power transmission member being disposed closer to the one end P1 of the flat portion with respect to the inclination direction in the chain straight-line area, for example, a permissible turning angle when the power transmission chain turns in a normal direction can be made large. In addition, when a load is applied to the contact portion A of the first power transmission member from the second power transmission member in the chain straight-line area, the first power transmission member attempts to rotate (rotate on its axis) relative to the link about the other end side of the flat portion with respect to the inclination direction as a fulcrum. However, as a result of a portion of the flat portion which is situated closer to the one end P1 side than the point of intersection P2 being lengthened sufficiently in the inclination direction, the rotation of the first power transmission member can be restricted in an ensured fashion by engagement of the flat portion with the link. This can ensure the suppression of slippage of the first power transmission member relative to the link, thereby making it possible to suppress the generation of fretting.

In addition, in the invention, there may be a case in which $0.5 \cdot h1 \leq h2$. As this occurs, a portion of the flat portion which is situated closer to the one end P1 side than the point of intersection P2 can be lengthened further in the inclination direction. As a result of this, the rotation of the first power transmission member can be suppressed in a more ensured fashion by engagement of the flat portion with the link.

Additionally, in the invention, there may be a case in which when seen from the chain widthwise direction, the first power transmission member has a curved corner portion (40) which connects to the flat portion and a radius of curvature R1 of the corner portion is made to satisfy the following expression relative to a corresponding radius of curvature R' of the second power transmission member.

$$0.9 \cdot R' \leq R1 \leq 1.1 \cdot R'$$

In this case, a value of the radius of curvature R1 of the corner of the first power transmission member and a value of the radius of curvature R' of the corresponding corner of the second power transmission member are made substantially the same. By doing so, a shape of a portion of the link which receives the corner of the first power transmission member and a shape of a portion of the link which receives the corner portion of the second power transmission member can be made substantially the same. As a result of this, a stress concentration factor of the portion of the link which receives the corner portion of the first power transmission member and a stress concentration factor of the portion of the link which receives the corner portion of the second power transmission member can be made substantially the same, whereby a stress concentration to either of these portions can be prevented, thereby making it possible to enhance the durability of the link through averaging out the loads in the link to substantially the same.

In addition, in the invention, there may be a case where when seen from the chain widthwise direction, the facing portion of the first power transmission member has a curved shape, the turning angle is limited to stay within a predetermined angle range, and at an arbitrary turning angle within the predetermined angle range, a normal plane (S2) which intersects a tangent plane (S1) of the facing portion of the first power transmission member at right angles in the position where the contact portion is formed is made to intersect the flat portion.

In this case, a load being applied to the first power transmission member when the load is being transmitted between the first and second power transmission members can be received at a portion of the link which faces the flat portion. By doing so, since the load can be transmitted to the link from a wide range of the flat portion, a peak value of stress generated in the link can be reduced, thereby making it possible to enhance the durability of the link through reduction in load of the link in a more ensured fashion.

In addition, in the invention, there may be a case in which the first power transmission member includes the curved corner portion and a curved connecting portion (41) which makes the flat portion and the corner portion to connect to each other, the connecting portion has a portion (43) which connects to the flat portion and a portion (42) which connects to the corner portion, and the radius curvature R1 of the corner portion, a radius of curvature R2 of the portion which connects to the corner portion and a radius of curvature R3 of the portion which connects to the flat portion satisfy the following expression.

$$R2 < R1 < R3$$

In this case, in the radii of curvatures R1, R2, R3, the radius of curvature R3 of the portion which connects to the flat portion is made largest. By doing so, a sharp curved portion can be prevented from being formed in the first power transmission member in a position lying in proximity to one end of the flat portion of the first power transmission member, whereby a stress concentration can be prevented from being generated in a portion of the link which receives the position of the first power transmission member which lies in proximity to the one end of the flat portion, thereby making it possible to reduce the stress in the link. In addition, in the radii of curvatures R1, R2, R3, the radius of curvature R1 of the corner portion is made second largest to follow the radius of curvature R3. By doing so, a large contact area can be ensured between the corner portion of the first power transmission member and the link, whereby stress that is to be generated in the link can be reduced through a reduction in a surface pressure applied to the link from the corner portion of the first power transmission member. In addition, as a result of the radii of curvatures R3, R1 of the portion connecting to the flat portion and the corner portion of the first power transmission member being individually made large sufficiently, most of the force applied to the link from the first power transmission member is received by the portion connecting to the flat portion and the corner portion, whereby force applied to the link from the portion connecting the corner portion becomes small, and hence, the radius of curvature R2 of this portion may be small.

The invention may comprise first and second pulleys (60, 70) which each have a pair of cone-shaped half pulley surfaces (62a, 63a, 72a, 73a) which face each other and the power transmission chain described above which is wound round to extend between these pulleys so as to be brought into engagement with the half pulley surfaces for transmission of power. In this case, a power transmission system can be realized which is superior in durability.

In the above description, the parenthesized numerals represent reference numerals given to corresponding constituent elements in a mode for carrying out the invention which will be described later. However, the purpose of giving the reference numerals is not to limit claims of the invention thereby.

BEST MODE FOR CARRYING OUT THE INVENTION

A preferred embodiment of the invention will be described by reference to the accompanying drawings.

Figure 1:
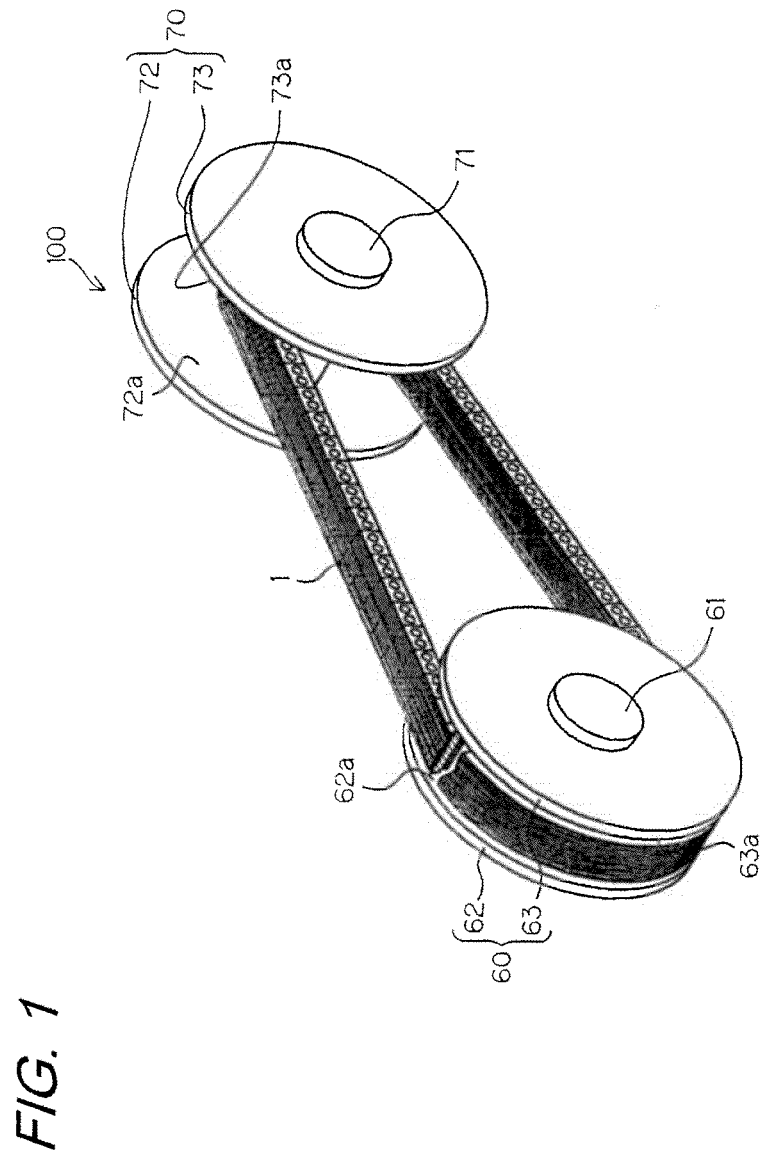
FIG. 1 is a perspective view showing exemplarily the configuration of a main part of a chain type continuously variable transmission as a power transmission system which includes a power transmission chain according to an embodiment of the invention.

FIG. 1 is a perspective view showing exemplarily the configuration of a main part of a chain type continuously variable transmission (hereinafter, also referred to simply as a continuously variable transmission as a power transmission system which includes a power transmission chain according to a first embodiment of the invention. Referring to FIG. 1, a continuously variable transmission 100 is such as to be mounted on a vehicle such as a motor vehicle and includes a drive pulley 60 as a first pulley which is made of a metal (a structural steel), a driven pulley 70 as a second pulley which is made of a metal (a structural steel) and an endless power transmission chain 1 (hereinafter, also referred to simply as a chain) which is wound round to extend between these pulleys. Note that the chain 1 shown in FIG. 1 is partially shown in section for the purpose of facilitation of understanding.

Figure 2:
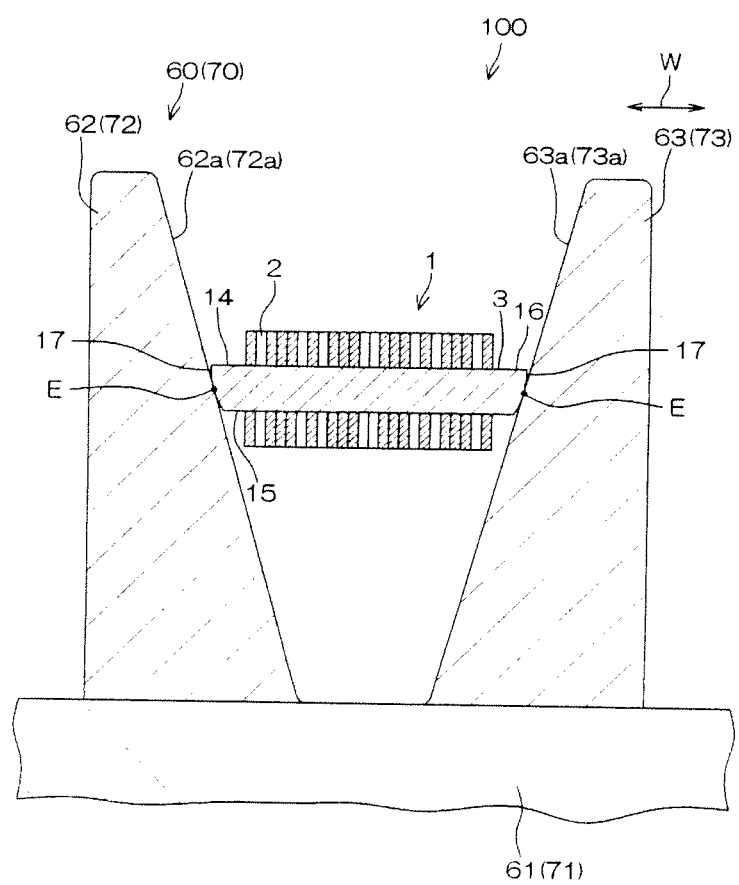
FIG. 2 is a partially enlarged sectional view of a drive pulley (a driven pulley) and the chain in FIG. 1.

FIG. 2 is a partially enlarged sectional view of the drive pulley 60 (the driven pulley 70) and the chain 1 shown in FIG. 1. Referring to FIGS. 1 and 2, the drive pulley 60 is attached to an input shaft 61 which connects to a power source of a vehicle so as to transmit power therefrom and can rotate together with the input shaft. The drive pulley 60 includes a fixed half pulley 62 and a movable half pulley 63. The fixed half pulley 62 and the movable half pulley 63 have their half pulley surfaces 62a, 63a which face each other and make a pair. The respective half pulley surfaces 62a, 63a include a cone-shaped inclined surface. A groove is defined between the half pulley surfaces 62a, 63a, and the chain 1 is held in the groove while being squeezed under a strong pressure.

A hydraulic actuator (not shown) is connected to the movable half pulley 63 so as to alter a groove width. The groove width is designed to be altered by moving the movable half pulley 63 in an axial direction (a left-right direction in FIG. 2) of the input shaft 61 when changing gear speeds. By doing so, the chain 1 is moved in a radial direction of the input shaft 61 (a vertical direction in FIG. 2) so as to alter an effective radius of the pulley 60 with respect to the chain 1 (hereinafter, also referred to as an effective radius of the pulley 60).

On the other hand, as is shown in FIGS. 1 and 2, the driven pulley 70 is attached to an output shaft 71 which connects to drive road wheels (not shown) so as to transmit power thereto and can rotate together with the output shaft. As with the drive pulley 60, the driven pulley 70 includes a fixed half pulley 73 and a movable half pulley 72 which have their half pulley surfaces 73a,72a which face each other and make a pair, defining a groove which squeezes the chain 1 under a strong pressure.

As with the movable half pulley 63 of the drive pulley 60, a hydraulic actuator (not shown) is connected to the movable half pulley 73 so as to alter a groove width by moving the movable half pulley 73 when changing gear speeds. By doing so, the chain 1 is moved so as to alter an effective radius of the pulley 70 with respect to the chain 1 (hereinafter, also referred to as an effective radius of the pulley 70).

Figure 3:
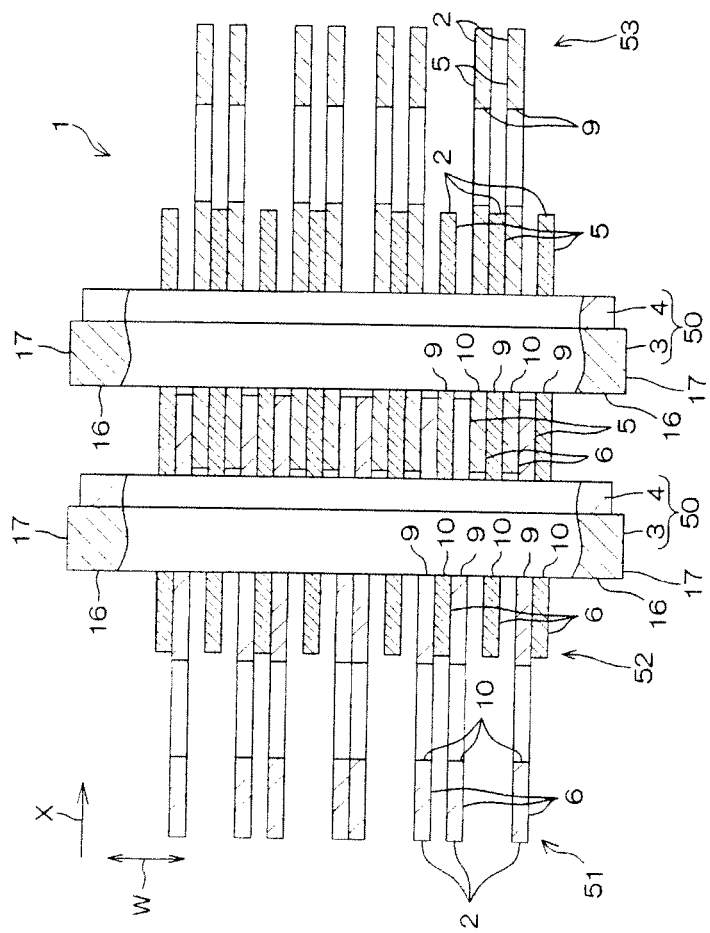
FIG. 3 is a partially sectional view of a main part of the chain.
Figure 4:
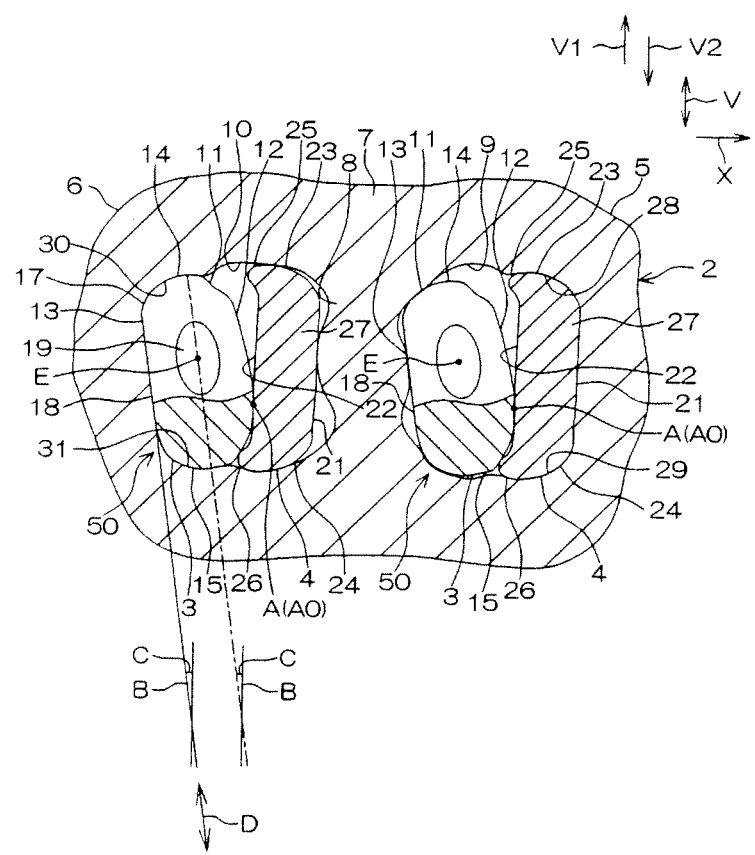
FIG. 4 is a partially sectional view of a main part of a chain straight-line area.

FIG. 3 is a partially sectional view of a main part of the chain 1. FIG. 4 is a partially sectional view of a main part of a chain straight-line area. Note that in the following description, when the description is made by reference to FIG. 4, the description is made based on a state resulting when the chain straight-line area is seen from a chain widthwise direction. Referring to FIGS. 3 and 4, the chain 1 includes a plurality of links 2 and a plurality of connecting members 50 which connect the links 2 to each other so that the links 22 turn.

Hereinafter, a direction along a advancing direction of the chain 1 is referred to as a chain advancing direction X, a direction which intersects the chain advancing direction at right angles and which extends along a longitudinal direction of the connecting members 50 is referred to as a chain widthwise direction W, and a direction which intersects both the chain advancing direction and the chain widthwise direction at right angles is referred to as a vertical direction V. One V1 of the vertical direction V is oriented radially outwards of the chain 1 when the chain 1 turns, and the other V2 of the vertical direction is oriented radially inwards of the chain 1 when the chain 1 turns.

Each link 2 includes a front end portion 5 and a rear end portion 6 which are a pair of end portions aligned at the front and rear of the link 2 in the chain advancing direction X and an intermediate portion 7 which is disposed between the front end portion 5 and the rear end portion 6.

A front through hole 9 as one of a pair of through holes and a rear through hole 10 as the other of the pair of through holes are formed in the front end portion 5 and the rear end portion 6, respectively. The intermediate portion 7 has a pillar portion 8 which constitutes a partition between the front through hole 9 and the rear through hole 10.

The links 22 are used to form a plurality of link units 51, 52, 53, . . . which are aligned in the chain advancing direction X (in FIG. 3, link units 51 to 53 are illustrated). The link 2 of each of the link units 51, 52, 53, . . . is connected to the links of the corresponding link units 51, 52, 53, . . . so as to turn relative to each other using the corresponding connecting members 50.

Specifically, the front through hole 9 of the link 2 of one link unit and the rear through hole 10 of the link which is laid adjacent to the one link unit with respect to the chain advancing direction X are arranged in parallel in the chain widthwise direction W. The links 22 which are laid adjacent to each other in the chain advancing direction X are connected together by the connecting members 50 which are inserted through the through holes 9, 10. By doing so, the endless chain 1 is formed.

Each connecting member 50 includes first and second pins 3, 4 which make a pair. These first and second pins 3, 4 are brought into rolling and sliding contact with each other in association with the adjacent links 2 turning relative to each other. Note that the rolling and sliding contact means a contact which includes at least one of a rolling contact and a sliding contact.

The first pin 3 is a first power transmission member which extends long in the chain widthwise direction W. A circumferential surface 11 of the first pin 3 is formed into a smooth surface and has a front portion 12 as a facing portion which is oriented to the front in the chain advancing direction X, a rear portion 13 acting as a back surface which is opposite to the front portion, and one end portion 14 and the other end portion 15 with respect to the vertical direction V.

The front portion 12 faces the second pin 4, which is one of the pair of pins and is brought into rolling and sliding contact with a rear portion 22 of the second pin 4, which will be described later, at a contact portion A (a contact point when seen from the chain widthwise direction W). In the straight-line area of the chain 1, the contact portion A0 is disposed at the front portion 12 in a position which is closer to the other V2 (closer to the other end portion 15) in the vertical direction V.

The front portion 12 has a curved shape which projects to the front in the chain advancing direction X. Specifically, a sectional shape of a portion of the front portion 12 which lies on the one V1 side of the vertical direction V with respect to the contact portion A0 includes an involute curve. By doing this, when the links 2 which lie adjacent to each other turn relatively, the first and second pins 3, 4 which face each other can be brought into smooth rolling contact, so as to attain a smooth turn between the links 2, thereby making it possible to suppress string-like vibrating motion of the chain 1. In addition, a sectional shape of a portion of the front portion 12 which lies on the other V2 side of the vertical direction V with respect to the contact portion A0 in the straight-line area of the chain 1 is formed into a smooth curve.

The rear portion 13 includes a flat portion 18. This flat portion 18 has a predetermined angle of attack C (for example, 5 to 12°, in the embodiment of the invention, 10°) relative to a predetermined plane B (a plane which intersects a surface of a sheet of paper on which FIG. 4 is drawn at right angles) which intersects the chain advancing direction X at right angles and is oriented towards the other V2 side of the vertical direction V. This flat portion 18 is inclined along an inclination direction D which is inclined relative to the chain advancing direction X when the chain straight-line area is seen from the chain widthwise direction W. An angle formed by the inclination direction D and the vertical direction V is the angle of attack C described above.

A pair of end portions 16 of the first pin 3 which lie along the longitudinal direction thereof (the chain widthwise direction W) both project in the chain widthwise direction from the links 2 which are disposed at the pair of end portions in the chain widthwise direction W. End faces 17 are provided respectively at the pair of end portions 16 as a pair of power transmission portions.

Referring to FIGS. 2 and 4, contact areas 19 of these end faces 17 are brought into engagement with the corresponding half pulley surfaces 62a, 63a, 72a, 73a of the respective pulleys 60, 70 via lubricant films so as to transmit power thereto.

The first pin 3 is squeezed between the corresponding half pulley surfaces 62a, 63a, 72a, 73a, whereby power is transmitted between the contact areas 19 of the end faces 17 of the first pins 3 and the respective pulleys 60, 70. Since the contact areas 19 of the first pin 3 contribute to direct power transmission, the first pin 3 is formed of a material such as a bearing steel (SUJ2), for example, which has high strength and which is superior in wear resistance. When seen along the chain widthwise direction W, the contact area 19 has, for example, an elliptic shape which is long in the inclined direction D, and a center of this ellipse constitutes a contact center point E.

When seen along the chain widthwise direction, a major axis 20 of the contact area 19 has the angle of attack C relative to the plane B when seen along the chain widthwise direction and advances to the front in the chain advancing direction X as it extends from the one V1 side to the other V2 side of the vertical direction V.

Referring to FIGS. 3 and 4, the second pin 4 (also referred to as a strip or an inter-piece) is a second power transmission which is formed of a similar material to that of the first pin 3 and which extends long in the chain widthwise direction W. The second pin 4 is formed shorter than the first pin 3 so that a pair of end portions thereof are not brought into contact with the half pulley surfaces of the respective pulleys. This second pin 4 is formed into a symmetrical shape with respect to the vertical direction V.

Referring to FIG. 4, a circumferential surface 21 of the second pin 4 extends in the chain widthwise direction W. This circumferential surface 21 has a rear portion 22 as a facing portion which is oriented towards the rear in the chain advancing direction X and one end portion 23 and the other end portion 24 with respect to the vertical direction V. The rear portion 22 includes a flat plane which intersects the chain advancing direction X at right angles. The flat plane of the rear portion 22 faces the front portion 12 of the first pin 3 with which the second pin 4 makes the pair. Collar portions 25, 26 are formed on the one end portion 23 and the other end portion 24, respectively. Both the collar portions 25, 26 extend to the rear in the chain advancing direction X with respect to a main body portion 27 of the second pin 4.

The chain 1 is a so-called press-fit type chain. Specifically, in the front through hole 9 in each link 2, the first pin 3 is fitted relatively movably, and the second pin 4, which makes the pair together with the first pin 3, is fixedly press fitted. In the rear through hole 10 of each link 2, the first pin 3 is fixedly press fitted and the second pin 4, which makes the pair together with the first pin 3, is relatively movably fitted.

Press contacted portions 28, 29 against which the second pin 4 is pressed are provided, respectively, at one end portion and the other end portion of the front through hole 9 with respect to the vertical direction V. The press contacted portion 28 is pressed against by a corner portion 46, which will be described later, of the one end portion 23 of the second pin 4 and is pressed towards the one V1 side of the vertical direction V. The other press contacted portion 29 is pressed against by a corner portion 47, which will be described later, of the other end portion 24 of the second pin 4 and is pressed towards the other V2 side of the vertical direction V.

Press contacted portions 30, 31 against which the first pin 3 is pressed are provided, respectively, at one end portion and the other end portion of the rear through hole 10 with respect to the vertical direction V. The press contacted portion 30 is pressed against by the one end portion 14 of the first pin 3 and is pressed towards the one V1 side of the vertical direction V.

The other press contacted portion 31 is pressed against by a corner portion 40, which will be described later, of the other end portion 15 of the first pin 3 and is pressed towards the other V2 side of the vertical direction V.

The front portion 12 of the first pin 3 and the flat portion of the rear portion 22 of the second pin 4 make rolling and sliding contact with each other on a contact portion A which is displaced in association with a change in a turning angle θ between the links 2 which are laid adjacent in the chain advancing direction X.

Figure 5:
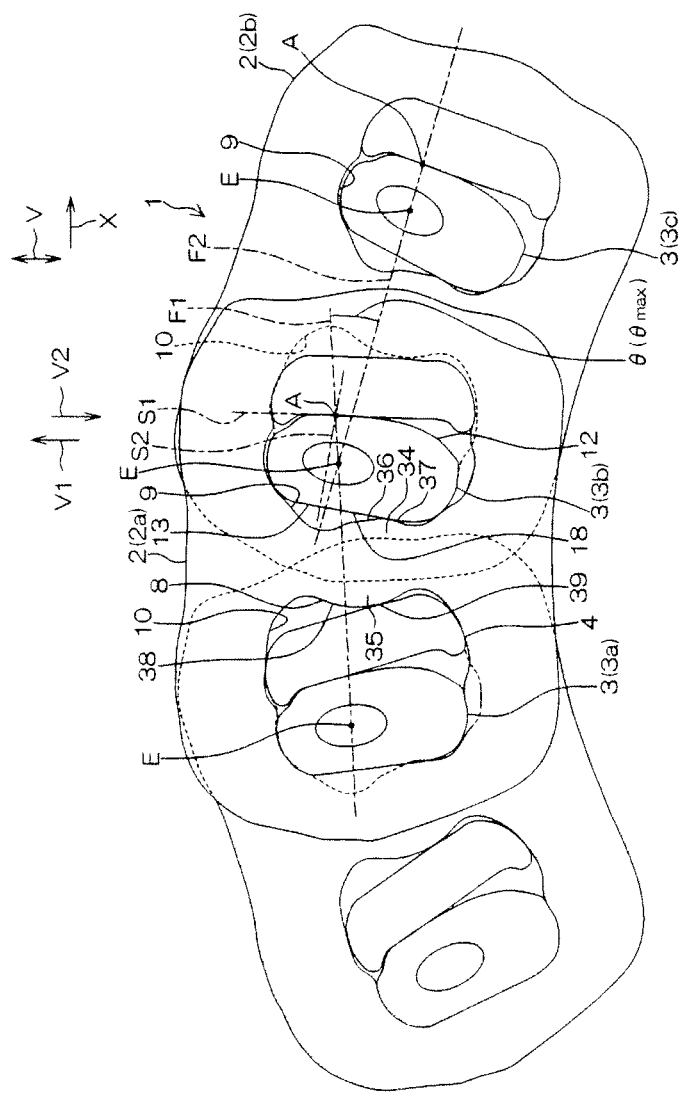
FIG. 5 is a side view of a chain turning area when a turning angle is a permissible turning angle on a positive side.
Figure 6:
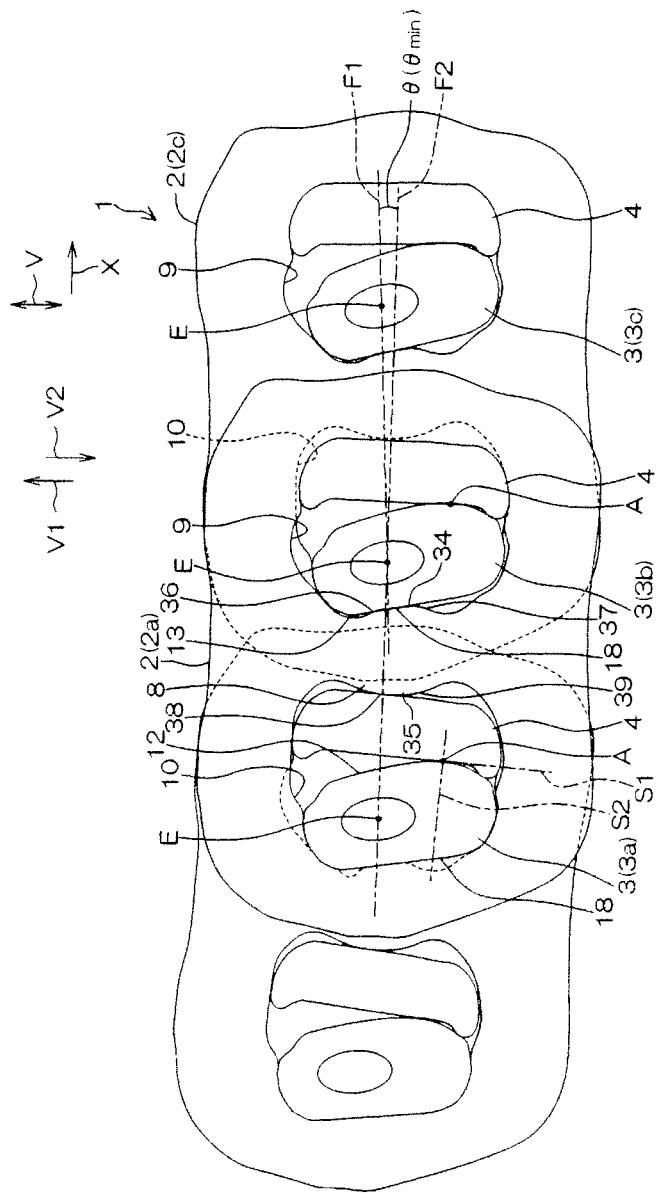
FIG. 6 is a side view of the chain turning area when the turning angle is a permissible turning angle on a negative side.

FIG. 5 is a side view of a chain turning area when the turning angle θ is a permissible turning angle θmax on a positive side. FIG. 6 is a side view of the chain turning area when the turning angle θ is a permissible turning angle θmin on a negative side. When the description is made by reference to FIG. 5 or 6, the description will be made based on a state resulting when the turning area of the chain 1 is seen from the chain widthwise direction.

This chain 1 is designed to shift to the straight-line area shown in FIG. 4 and the turning area shown in FIG. 5 in an alternate fashion, and when force is inputted which bends the chain 1 in a reverse direction, there may occur a case in which the chain 1 shifts to a curved area shown in FIG. 6.

By reference to FIG. 5, the links 2 which are laid adjacent to each other in the chain advancing direction and which reside in the turning area of the chain 1 turn relative to each other with a predetermined turning angle θ formed therebetween. The turning angle θ is defined as an angle formed between a first plate F1 and a second plane F2.

The first plane F1 denotes a plane which include respective contact central points E of a pair of first pins 3a, 3b which are inserted through both through holes 9, 10 of one link 2a in the turning area and which is parallel to the chain widthwise direction W.

The second plane F2 denotes a plane which include respective contact central points E of a pair of first pins 3b and 3c which are inserted through both through holes 9, of the other link which is adjacent to the link 2a in the chain widthwise direction W.

The positive permissible turning angle θmax, that is, a maximum value of the turning angle θ which results when the turning angle θ takes a positive value is set to 20°, for example. In addition, referring to FIG. 6, the negative permissible turning angle θmin, that is, a maximum value of the turning angle θ when the turning angle θ takes a negative value is set to -4°, for example. With the turning angle θ taking a negative value, an increase in the turning angle θ means that an absolute value of the turning angle θ is increased.

In the event that the turning angle θ is the positive permissible turning angle θmax and the negative permissible turning angle θmin, further turn (overshooting) of the chain 1 beyond the respective permissible turning angles is restricted by the pillar portion 8 of the link 2.

Figure 7:
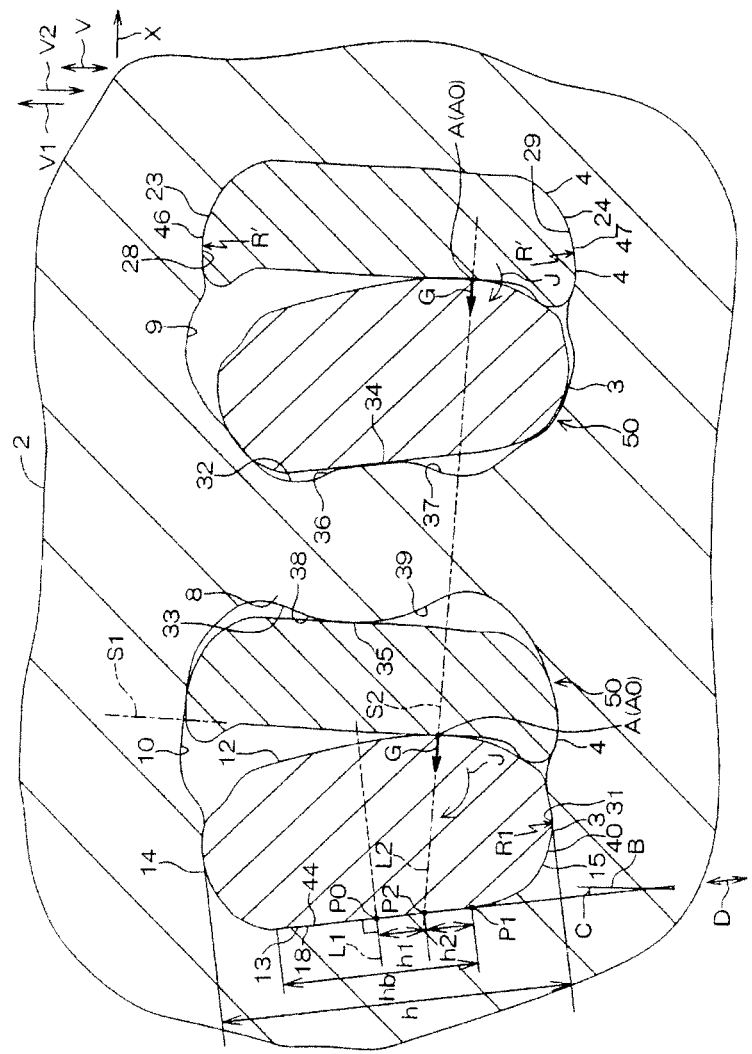
FIG. 7 is an enlarged view of a main part of FIG. 4.

FIG. 7 is an enlarged view of a main part of FIG. 4. When the description is made by reference to FIG. 7, as with the description made by reference to FIG. 4, the description is made based on a state resulting when the chain straight-line area is seen from the chain widthwise direction.

As is shown in FIG. 7, the pillar portion 8 of the link 2 has such a shape that both end portions of the pillar portion 8 with respect to the vertical direction V are constricted, while a central portion is swollen. The pillar portion 8 of each link 2 includes one side portion 32 which constitutes part of an inner circumferential surface of the front through hole 9 and the other side portion 33 which constitutes part of an inner circumferential surface of the rear through hole 10. Projecting portions 34, 35 are provided, respectively, at central portions of the respective side portions 32, 33 with respect to the vertical direction V. The one projecting portion 34 projects towards the front through hole 9 side, whereas the other side portion 33 projects towards the rear through hole 10 side.

A pair of sloping surfaces 36, 37 of the one side portion 32 which slope down from an apex portion of the projecting portion 34 are configured as restricting portions which restrict the turning angle between the links 2. A pair of sloping surfaces 38, 39 of the other side portion 33 are configured as restricting portions which restrict the turning angle between the links 2.

As is shown in FIG. 5, when the turning angle θ is the positive permissible turning angle θmax, the sloping surface 37 of the one projecting portion 34 which lies on the other V2 side of the vertical direction V is brought into abutment with the flat portion 18 of the rear portion 13 of the first pin 3. In addition, the sloping surface 39 of the other projecting portion 35 which lies on the other V2 side of the vertical direction V is brought into abutment with the second pin 4. As a result, further turn of the chain 1 towards the positive side is restricted.

As is shown in FIG. 6, when the turning angle θ is the negative permissible turning angle θmin, the sloping surface 36 of the one projecting portion 34 which lies on the one V1 side of the vertical direction V is brought into abutment with the flat portion 18 of the rear portion 13 of the first pin 3. In addition, the sloping surface 38 of the other projecting portion 35 which lies on the one V1 side of the vertical direction V is brought into abutment with the second pin 4. As a result, further turn of the chain 1 towards the negative side is restricted.

Referring to FIG. 7, a point of intersection P0 is formed by an imaginary line L1 which passes through a center position of an overall height h of the first pin 3 along the inclination direction D and intersects the inclination direction D at right angles when the chain straight-line area is seen from the chain widthwise direction W intersecting the flat portion 18.

In addition, an imaginary line L2 is specified which passes through both the contact portion A0 within the front through hole 9 of the link 2 and the contact portion A0 within the rear through hole 10 and extends in the chain advancing direction X when the chain straight-line area is seen from the chain widthwise direction W. A point of intersection P2 is formed on the flat portion 18 by this imaginary line L2 intersecting the flat portion 18. This point of intersection P2 is formed between the point of intersection P0 and one end P1 of the flat portion 18 which lies on the other V2 side of the vertical direction V with respect to the inclination direction D.

When a distance between the point of intersection P0 and the point of intersection P2 is referred to as h1 and a distance between the point of intersection P2 and the one end P1 of the flat portion 18 is referred to as h2 with respect to the inclination direction D, the following expression (1) is satisfied.

$$0.1 \cdot h1 \leq h2 \quad (1)$$

Namely, the distance h2 from the point of intersection P2 to the one end P1 of the flat portion 18 is set to 10% or more of the distance h1 between the point of intersection P0 and the point of intersection P2 with respect to the inclination direction D.

In the chain straight-line area, the contact portions A0 of the first and second pins 3, 4 are disposed in positions on the first and second pins 3, 4 which lie closer to the other V2 side of the vertical direction D. Because of this, when a load G directed to the rear in the chain advancing direction X is applied to the contact portion A0 of the first pin 3 from the second pin 4 in the chain straight-line area, the first pin 3 attempts to rotate (rotate on its axis) about a one end portion 14 side as a fulcrum in a predetermined rotating direction J relative to the link 2 so that the angle of attack C becomes small.

However, since a portion of the flat portion 18 which is situated closer to the one end P1 side than the point of intersection P2 is lengthened sufficiently in the inclination direction D, when the first pin 3 attempts to rotate on its axis, the rotation of the first pin 3 can be restricted in an ensured fashion by the flat portion 18 being received by the link 2. By doing so, the first pin 3 can be prevented from slipping relative to the link 2 in an ensured fashion.

From the viewpoint of lengthening the length by which the flat portion 18 is received by the link 2 longer with respect to the inclination direction D when the first pin 3 attempts to rotate on its axis in the predetermined rotating direction J, $0.5 \cdot h1 \leq h2$ is preferable, and $h1 \leq h2$ is more preferable. In this embodiment, $h1 \eqsim h2$.

Figure 8:
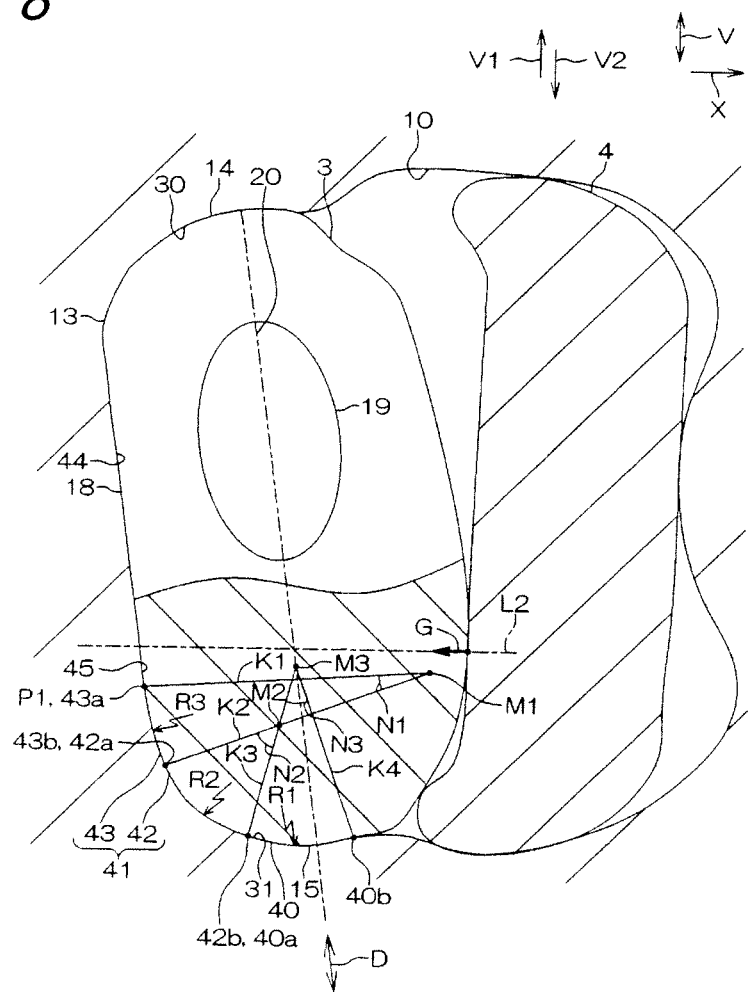
FIG. 8 is an enlarged view of the periphery of a rear through hole in a link.

FIG. 8 is an enlarged view of the periphery of the rear through hole 10 in the link 2. When the description is made by reference to FIG. 8, the description is made based on a state resulting when the chain straight-line area is seen from the chain widthwise direction W. Referring to FIG. 8, the other end portion 15 of the first pin 3 includes a curved corner portion 40 which is oriented towards the other V2 side of the vertical direction V and a curved connecting portion 41 which connects the flat portion 18 and the corner portion 40 together.

The corner portion 40 is formed into an arced surface shape which has a predetermined radius of curvature R1 and constitutes a portion of the other end portion 15 of the first pin 3 which lies closest to the other V2 side. This corner portion 40 is in abutment with the press contacted portion 31 of the rear through hole 10 in the link 2 to thereby press the press contacted portion 31 towards the other V2 side of the vertical direction V. By doing so, a relative movement between the corner portion 40 and the press contacted portion 31 is restricted.

The connecting portion 41 includes a portion 42 connecting to the corner portion and a portion 43 connecting to the flat portion. The portion 42 connecting to the corner portion and the portion 43 connecting the flat portion are connected together continuously and smoothly. The portion 42 connecting to the corner portion is disposed rearwards relative to the corner portion 40 in the chain advancing direction X and is connected to the corner portion 40 continuously and smoothly. The portion 42 connecting to the corner portion is formed into an arced surface shape having a predetermined radius of curvature R2.

The portion 43 connecting to the flat portion is disposed rearwards relative to the portion 42 connecting to the corner portion in the chain advancing direction X and is connected to the portion 42 connecting to the corner portion continuously and smoothly. In addition, the portion 43 connecting to the flat portion is also connected to the one end P1 of the flat portion 18 continuously and smoothly. The portion 43 connecting to the flat portion is formed into an arced surface shape having a predetermined radius of curvature R3.

The portion 43 connecting to the flat portion is defined between first and second planes K1, K2. The first and second planes K1, K2 are each a plane which includes a curvature center line M1 of the portion 43 connecting to the flat portion and which is parallel to the chain widthwise direction W. The curvature center line M1 of the portion 43 connecting to the flat portion is situated, for example, on the other V2 side of the vertical direction V relative to the imaginary line L2 and passes through the first pin 3. An angle N1 (an included angle as seen from the chain widthwise direction W) formed by the first and second planes K1, K2 is set substantially to 18°. The first plane K1 intersects the one end P1 of the flat portion 18 at right angles and also intersects one end 43a of the portion 43 connecting to the flat portion at right angles.

The portion 42 connecting to the corner portion is defined by the second plane K2 and a tertiary plane K3. A curvature center line M2 of the portion 42 connecting to the corner portion is disposed on the second plane K2 and passes through the first pin 3, for example. This curvature center line M2 is situated between the curvature center line M1 of the portion 43 connecting to the flat portion and the other end 43b of the portion 43 connecting to the flat portion on the second plane K2.

The tertiary plane K3 is a plane which includes the curvature center line M2 of the portion 42 connecting to the corner portion and which is parallel to the chain widthwise direction W. The curvature center line M2 of the portion 42 connecting to the corner portion is also a line of intersection with the second and tertiary lanes K2, K3. An angle N2 (an included angle as seen from the chain widthwise direction W) by the second and tertiary planes K2, K3 is set substantially to 48°. The second plane K2 intersects the other end 43b of the portion 43 connecting to the flat portion at right angles and also intersects one end 42a of the portion 42 connecting to the corner portion at right angles.

The corner portion 40 is defined by the tertiary plane K3 and a quaternary plane K4. A curvature center line M3 of the corner portion 40 is disposed on the tertiary plane K3 and passes through the first pin 3, for example. In addition, as seen from the chain widthwise direction W, the curvature center line M3 of the corner portion 40 is disposed on the major axis 20 of the contact area 19. The quaternary plane K4 is a plane which includes the curvature center line M3 of the corner portion 40 and which is parallel to the chain widthwise direction W. The curvature center line M3 of the corner portion 40 is also a line of intersection with the tertiary and quaternary planes K3, K4. An angle N3 (an included angle as seen from the chain widthwise direction W) formed by the tertiary and quaternary planes K3, K4 is set substantially to 40°, for example. The tertiary plane K3 intersects the other end 42b of the portion 42 connecting to the corner portion at right angles and also intersects one end 40a of the corner portion 40 at right angles. The quaternary plane K4 intersects the other end 40b of the corner portion 40 at right angles.

The radius of curvature R1 of the corner portion 40, the radius of curvature R2 of the portion 42 connecting to the corner portion and the radius of curvature R3 of the portion 43 connecting to the flat portion are made to satisfy the following expression (2)

$$R2 < R1 < R3 \quad (2)$$

Namely, in the corner portion 40, the portion 42 connecting to the corner portion and the portion 43 connecting to the flat portion, the portion 43 connecting to the flat portion has a flattest shape, the corner portion 40 has a shape close to flatness, and following the corner portion 40, the portion 42 connecting to the corner portion has a shape close to flatness.

A circumferential edge portion 44 of the rear through hole 10 in the link 2 includes the press contacted portions 30, 31 and a receiving portion 45 which is disposed between the press contacted portions 30, 31 and which receives the first pin 3 from the rear in the chain advancing direction X. As seen from the chain widthwise direction W, the receiving portion 45 has a shape which matches both the shape of the flat portion 18 of the rear portion 13 and the shape of the connecting portion 41 of the first pin 3. When the load G from the second pin 4 is applied to the contact portion A0 of the first pin 3, the load G is received by the press contacted portions 30, 31 and the receiving portion 45 of the circumferential edge portion 44 of the rear through hole 10 in the corresponding link 2.

Referring to FIGS. 5 and 6, as has been described above, the turning angle θ is limited to stay between the negative permissible turning angle θmin and the positive permissible turning angle θmax (in this embodiment, −4° to 20°) which define a predetermined angle range. A normal plane S2 which intersects a tangent plane S1 of the front portion 12 of the first pin 3 at right angles in the position where the contact portion A is formed is designed to intersect the flat portion 18 of the first pin 3 at an arbitrary turning angle θ between the negative permissible turning angle θmin and the positive permissible turning angle θmax.

Specifically, for example, as is shown in FIG. 7, when assuming that a length of the flat portion 18 with respect to the inclination direction D is referred to as hb, the turning angle is designed so that the following expression (3) is established.

$$h/2 \leq hb \quad (3)$$

Namely, the length hb of the flat portion 18 is referred to as being a half or more of the overall height h of the first pin 3 with respect to the inclination direction D. In addition, with respect to the inclination direction D, the flat portion 18 is disposed substantially at the center of the first pin 3. By doing so, the length hb of the flat portion 18 with respect to the inclination direction D can be lengthened sufficiently, an area over which the flat portion 18 is allowed to be received by the circumferential edge portion 44 of the rear through hole 10 in the link 2 can be increased further.

By adopting the configuration that has been described heretofore, the normal plane S2 which intersects the tangent plane S1 of the front portion 12 of the first pin 3 at right angles in the position where the contact portion A is formed intersects the flat portion 18 of the first pine 3 in the chain straight-line area, that is, the area where the turning angle θ is zero.

Referring to FIG. 5, the normal plane S2 which intersects the tangent plane S1 of the front portion 12 of the first pin 3 in the position where the contact portion A is formed intersects the flat portion 18 of the first pin 3 in the chain turning area where the turning angle θ takes a positive value.

Referring to FIG. 6, similarly, the normal plane S2 which intersects the tangent plane S1 of the front portion 12 of the first pin 3 at right angles in the position where the contact portion A is formed intersects the flat portion 18 of the first pin 3 in the chain turning area where the turning angle θ takes a negative value.

Referring to FIG. 7, again, corner portions 46, 47 are formed at the one end portion 23 and the other end portion 24 of the second pin 4, respectively. The corner portion 46 is configured as a portion of the one end portion 23 of the second pin 4 which lies closest to the one V1 side with respect to the vertical direction V. The corner portion 47 is configured as a portion of the other end portion 24 of the second pin 4 which lies closest to the other V2 side with respect to the vertical direction V.

A radius of curvature at the one end portion 23 of the second pin 4 increases continuously or step by step as it advances towards the one V1 side of the vertical direction V. A radius of curvature at the other end portion 24 of the second pin 4 increases continuously or step by step as it advances towards the other V2 side of the vertical direction V.

The corner portion 46 is formed into an arced surface having a single radius of curvature R'. This radius of curvature R' takes a largest value in the radius of curvature of the one end portion 23 of the second pin 4. The corner portion 47 is formed into an arced surface having the single radius of curvature R'. This radius of curvature R' takes a largest value in the radius of curvature of the other end portion 24 of the second pin 4.

The corner portion 46 of the one end portion 23 of the second pin 4 presses the press contacted portion 28 of the corresponding front through hole 9 towards the one V1 side of the vertical direction V. In addition, the corner portion 47 of the other end portion 24 of the second pin 4 presses the press contacted portion 29 of the corresponding front through hole 9 towards the other V2 side of the vertical direction V.

As to the corner portion 47 of the other end portion 24 of the second pin 4 and the corner portion 40 of the other end portion 15 of the first pin 3 which constitute corner portions which face each other, the respective radii of curvatures R', R1 are designed to satisfy the following expression (4).

$$0.9 \cdot R' \leq R1 \leq 1.1 \cdot R' \tag{4}$$

Namely, the radius of curvature R1 of the corner portion 40 of the other end portion 15 of the first pin 3 is set to be 90% to 110% of the radius of curvature R' of the corner portion 47 of the other end portion 24 of the second pin 4. By setting the radius of curvature R1 to take substantially the same value of the radius of curvature R' in the way described above, a stress concentration factor at the press contacted portion 31 which receives the corner portion 40 of the first pin 3 and a stress concentration factor at the press contacted portion 29 which receives the corner portion 47 of the second pin 4 can be made substantially equal to each other. As a result of this, large stress can be prevented from being applied only to either of these press contacted portions 31, 29.

After having been fabricated using the pluralities of links 2 and connecting members 50, the chain 1 having the configuration that has been described schematically is wound round a jig having a pair of pulleys which are similar to the drive pulley 60 and the driven pulley 70 which are shown in FIG. 1, and tensile force is imparted to the chain 1 by the pair of pulleys. The tensile force then is referred to as a value at which stress is generated in the link 2 which exceeds its elastic limit and is set to several tens kN, for example. By doing so, a preliminary tension as compressive residual stress is imparted to each link 2, so as to enhance the fatigue strength of each link 2.

As has been described heretofore, according to the embodiment, the contact portion A0 is disposed at the portion of the first pin 3 which lies closer to the one end P1 of the flat portion with respect to the inclination direction V in the chain straight-line direction, whereby the permissible turning angle θmax when the chain 1 turns in the normal direction can be made large.

In addition, when the load G from the second pin 4 is applied to the contact portion A0 of the first pin 3 in the chain straight-line area, the first pin 3 attempts to rotate (rotate on its axis) relative to the link 2 about the other end side of the flat portion 18 with respect to the inclination direction D as a fulcrum. However, the portion of the flat portion 18 which is situated closer to the one end P1 side than the point of intersection P2 is lengthened sufficiently in the inclination direction D, as a result of which the rotation of the first pin 3 can be restricted in an ensured fashion by the engagement of the flat portion 18 with the link 2. Because of this, the first pin 3 can be prevented from slipping relative to the link 2 in an ensured fashion, thereby making it possible to suppress the generation of fretting.

Further, in the event of 0.5·h1≤h2, the portion of the flat portion 18 which is situated closer to the one end P1 side than the point of intersection P2 can be lengthened in the inclination direction D. As a result of this, the rotation of the first pin 3 can be restricted in a more ensued fashion by the engagement of the flat portion 18 with the link 2.

In addition, as a result of the rotation of the first pin 3 being suppressed in the rear through hole 10 in the link 2, a difference between tensile force by which the link 2 starts plastic deformation when tensile force is applied along the chain advancing direction X and tensile force by which the link 2 fails can be made extremely large. When a preliminary tension is imparted by applying tensile force to the link 2 as a load to thereby deform the link 2 plastically, each link 2 can plastically be deformed with sufficient tensile force, thereby making it possible to impart the preliminary tension to each link 2 in an ensured fashion. The fatigue strength of each link 2 can be increased.

In addition, by the first and second pins 3, 4 being fixedly press fitted in the rear through hole 10 and the front through hole 9 which face each other in the link 2, these first and second pins 3, 4 can be prevented from shifting relative to the link 2, thereby making it possible to prevent the generation of fretting in a more ensured fashion.

Further, the radius of curvature R1 of the corner portion 40 of the first pin 3 and the radius of curvature R' of the facing corner portion 47 of the other end portion 24 of the second pin 4 are made to take substantially the same values. By doing so, the shape of the press contacted portion 31 of the link 2 which receives the corner portion 40 of the first pin 3 and the shape of the press contacted portion 29 of the link 2 which receives the corner portion 47 of the second pin 4 can be made substantially the same. As a result of this, the stress concentration factors of the press contacted portions 31, 29 can be made substantially the same, whereby the concentration of stress to either of the press contacted portions 31, 29 can be prevented. Thus, the durability of the link 2 can be enhanced through averaging out the loads in the link 2 to substantially the same.

The normal plane S2 which intersects the tangent plane S1 of the front portion 12 of the first pin 3 at right angles in the position where the contact portion A is formed at the arbitrary turning angle θ between the positive permissible turning angle θmax and the negative permissible turning angle θmin intersects the flat portion 18.

By doing so, when the load is being transmitted between the first and second pins 3, 4 at the arbitrary turning angle θ, the load G applied to the first pin 3 can be received by the receiving portion 45 of the link 2 which faces the flat portion 18. Since this enables the transmission of load to the link 2 from a wide range of the flat portion 18, a peak value of stress generated in the link 2 can be reduced, thereby making it possible to enhance the durability of the link 2 through reduction of the load on the link 2 in an ensured fashion.

Further, in the radius of curvature R1 of the corner portion 40 of the first pin 3, the radius of curvature R2 of the portion 42 connecting to the corner portion and the radius of curvature of the portion 43 connecting to the flat portion, the radius of curvature R3 of the portion 43 connecting to the flat portion is made largest. By doing so, a sharp curved portion can be prevented from being formed in the first pin 3 in the position lying in proximity to the one end P1 of the flat portion 18 of the first pin 3, whereby stress concentration can be prevented from being generated in the receiving portion 45 of the link 2 which receives the portion of the flat portion 18 which lies in proximity to the one end P1 thereof, thereby making it possible to reduce stress in the link 2.

In the radii of curvatures R1, R2, R3, the radius of curvature R1 of the corner portion 40 is made second largest to follow the radius of curvature R3. By doing so, a large contact area can be ensured between the corner portion 40 of the first pin 3 and the link 2, whereby stress generated in the link 2 can be reduced through a reduction in surface pressure applied to the press contacted portion 31 of the link 2 from the corner portion 40 of the first pin 3.

In addition, as a result of the radii of curvatures of the portion 43 connecting to the flat portion and the corner portion 40 being made large sufficiently, most of the force applied to the link 2 from the first pin 3 is received by the portion 43 connecting to the flat portion and the corner portion 40, whereby force applied from the portion 42 connecting to the corner portion to the link 2 is small, and the radius of curvature R2 of this portion 42 may be small.

As a result of the durability of the link being enhanced, the link 2 can be made small in size by shortening the length of the link 2 further with respect to the chain advancing direction X. In the event that the link 2 is made small in size, the connecting pitch of the chain 1, that is, the connecting pitch between the contact central point E of the first pin 3 which is inserted through the front through hole 9 in the link 2 and the contact center point E of the first pin 3 which is inserted through the rear through hole 10 can be shortened further. In the event that the connecting pitch is shortened, the number of first pins 3 which are squeezed in the respective pulleys 60, 70 can be increased, whereby the load of each first pin 3 can be reduced, thereby making it possible to reduce impact resulting when the first pins 3 are squeezed in the respective pulleys 60, 70. As a result of this, noise generated when the first pins 3 are so squeezed can be reduced.

From what has been described above, the continuously variable transmission 100 which has superior durability can be realized through enhancement in durability of the chain 1.

The invention is not limited to the contents of the embodiment that has been described heretofore but can be modified variously without departing from the spirit and scope of the invention. For example, the portion 42 of the connecting portion 41 which connects to the corner portion may be omitted. As this occurs, the other end 43b of the portion 43 connecting to the flat portion is connected to the one end 40a of the corner portion 40.

The invention can be applied to a so-called block type chain which includes power transmission blocks which are formed integrally on pins and which project to both sides in the chain widthwise direction.

In addition, the invention is not limited to the mode in which both the groove widths of the drive pulley 60 and the driven pulley 70 are variable but may be applied to a mode in which only a groove width of either of a drive pulley and a driven pulley is variable while a groove width of the other pulley is fixed and is hence not variable. Further, in the embodiment, while the groove widths are described as being variable continuously (in a stepless fashion), the invention may be applied to other power transmissions in which groove widths of pulleys vary step by step or are fixed (no change in gear speeds).

EXAMPLE

Figure 9:
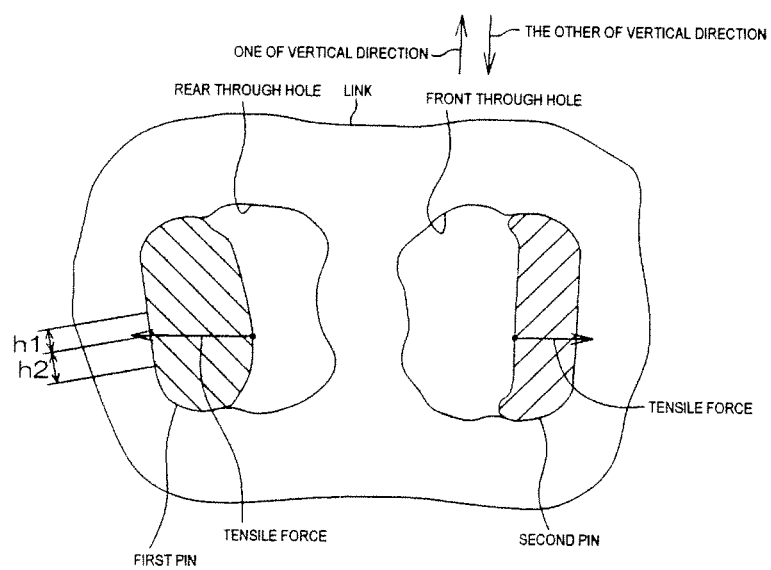
FIG. 9 is a partially sectional view of a test example.

A test example shown in FIG. 9 is modeled on an electronic computer. This test example includes a link, a first pin and a second pin which are similar to those shown in FIG. 4 and the second pin 2 is fixedly press fitted in a front through hole in the link and the first pin is fixedly press fitted in a rear through hole in the link.

Tensile force directed to the rear in the chain advancing direction was applied to a contact portion of the first pin in a chain straight-line area, and tensile force directed to the front in the chain advancing direction is applied to a contact portion of the second pin in the chain straight-line area. A value of the tensile force applied to the first pin and a value of the tensile force applied to the second pin were made equal to each other.

First tensile force which is tensile force generated when stress exceeding the elastic limit is generated in the whole area of a portion of the test example which lies between an edge portion of the rear through hole in the link which is situated on the other side of the vertical direction and an outer circumferential edge portion of the link which is aligned with this edge portion in the vertical direction and second tensile force which is tensile force generated when the link fails were each obtained by the finite element method (FEM).

A simulation of loading the aforesaid tensile forces was carried out a plurality of number of times by altering a value of $h2/h1$ in relation to the first pin as required.

Figure 10:
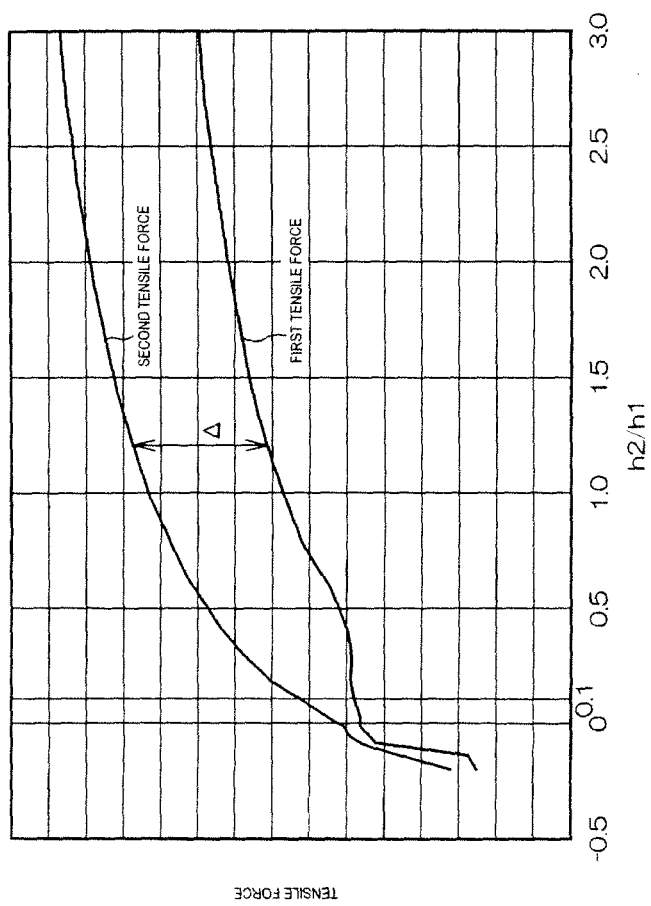
FIG. 10 is a graph diagram showing the result of analysis of the test example.

The results are shown in FIG. 10. In FIG. 10, an axis of ordinates represents tensile force applied to the test sample and an axis of abscissas represents the value of $h2/h1$ in relation to the first pin. A state in which the value of $h2/h1$ is a negative value denotes a state in which an imaginary line (corresponding to the imaginary line L2 in FIG. 4) which passes through a contact portion of the first pin in the chain straight-line area and extends in the chain advancing direction as viewed in the chain widthwise direction is situated on the other side of the vertical direction relative to one end of a flat portion.

As is shown in FIG. 10, the result is obtained that when $h2/h1$ takes a value ranging from a negative side to zero, a difference $\Delta$ between the first tensile force and the second tensile force is small.

On the other hand, when $ha/h1$ is 0.1, the difference $\Delta$ between the first tensile force and the second tensile force becomes clear. This difference $\Delta$ increases continuously as the value of $h2/h1$ increases from 0.1. Then, when $h2/h1$ is 0.5, the difference $\Delta$ becomes substantially constant whether the value of $h2/h1$ takes any value. The reason for this is considered that the first pin fixedly press fitted in the rear through hole in the link can be prevented from rotating (rotating on its axis) so that the angle of attack is reduced relative to the link.

In addition, both the first tensile force and the second tensile force increase as the value of $h2/h1$ increases.

It is proved from what has been described above that the difference $\Delta$ between the first tensile force and the second tensile force can be increased in an ensured fashion by $h2/h1 \geq 0.1$, that is, $0.1 \cdot h1 \leq h2$. Further, it is proved that the difference $\Delta$ between the first tensile force and the second tensile force can be increased extremely by $h2/h1 \geq 0.5$, that is, $0.5 \cdot h1 \leq h2$.

The invention claimed is:

1. A power transmission chain comprising:
a plurality of links which are aligned in a chain advancing direction and a plurality of connecting members which extend in a chain widthwise direction which is at right angles to the chain advancing direction so as to connect the links together,
wherein the connecting member includes first and second power transmission members which have facing portions which face each other,
the facing portions rollingly and slidably contact each other at a contact portion A which is displaced in association with a change in a turning angle between the links,
a flat portion is provided on a back surface of the first power transmission member which lies opposite to the facing portion, the flat portion is inclined along an inclination direction which is inclined relative to the chain advancing direction when a chain straight-line area is seen from the chain widthwise direction, a point of intersection P0 is formed by an imaginary line L1 which passes through a central position of an overall height of the first power transmission member along the inclination direction and which intersects the inclination direction at right angles intersecting the flat portion when the chain straight-line area is seen from the chain widthwise direction, a point of intersection P2 is formed by an imaginary line L2 which passes through the contact portion A and extends in the chain advancing direction intersecting the flat portion between the point of intersection P0 and one end P1 of the flat portion when the chain straight-line area is seen from the chain widthwise direction, and the following expression is satisfied when a distance between the point of intersection P0 and the point of intersection P2 is referred to as h1 and a distance between the point of intersection P2 and the one end P1 of the flat portion is referred to as h2 with respect to the inclination direction:

$0.1 \cdot h1 \leq h2$, and wherein the first power transmission member includes the curved corner portion and a curved connecting portion which connects the flat portion and the corner portion together, the connecting portion has a portion which connects to the flat portion and a portion which connects to the corner portion, and the radius curvature R1 of the corner portion, a radius R2 of curvature of the portion which connects to the corner portion and a radius R3 of curvature of the portion which connects to the flat portion satisfy the following expression:

$R2 < R1 < R3$.

2. A power transmission chain as set forth in claim 1, wherein $0.5 \cdot h1 \leq h2$.

3. A power transmission chain as set forth in claim 1, wherein when seen from the chain widthwise direction, the first power transmission member has a curved corner portion which connects to the flat portion, and a radius of curvature R1 of the corner portion is made to satisfy the following expression relative to a corresponding radius of curvature R' of the second power transmission member:

$0.9R' \leq R1 \leq 1.1 \cdot R'$.

4. A power transmission chain as set forth in claim 1, wherein when seen from the chain widthwise direction, the facing portion of the first power transmission member has a curved shape, the turning angle is limited to stay within a predetermined angle range, and at an arbitrary turning angle within the predetermined angle range, a normal plane of the first power transmission member which intersects a tangent plane of the facing portion at right angles in the position where the contact portion is formed is made to intersect the flat portion.

5. A power transmission system comprising:

first and second pulleys which each have a pair of cone-shaped half pulley surfaces which face each other; and the power transmission chain as set forth in claim 1 which is wound round to extend between the pulleys so as to be brought into engagement with the half pulley surfaces for transmission of power.

6. A power transmission chain as set forth in claim 1, wherein the flat portion is inclined at 5° to 12° relative to the chain advancing direction when the chain straight-line area is seen from the chain widthwise direction.

* * * * *